UNITED STATES PATENT OFFICE.

WILLIAM VINCENT COONS AND BERT HEWITT, OF VICTORIA, BRITISH COLUMBIA, CANADA.

PROCESS WHEREBY A VALUABLE AND NUTRITIOUS EXTRACT IS PRODUCED FROM FISH OR OTHER AQUATIC ANIMALS.

1,209,399. Specification of Letters Patent. Patented Dec. 19, 1916.

No Drawing. Application filed November 6, 1915. Serial No. 60,069.

*To all whom it may concern:*

Be it known that we, WILLIAM VINCENT COONS, a citizen of the United States of America, residing at Victoria, in the Province of British Columbia, Dominion of Canada, and BERT HEWITT, a citizen of the Dominion of Canada, residing at Victoria, in the Province of British Columbia, Dominion of Canada, have jointly invented a certain new and useful Process Whereby a Valuable and Nutritious Extract is Produced from Fish or other Aquatic Animals, of which the following is a specification.

The object of this invention is to create a new and useful art or process for the utilization of fish or other aquatic animals.

Heretofore in the processes of making extract from fish, it was endeavored to obtain the extractives by means of cold water, but such a small amount of extractives are obtained by this manner that it is not practical commercially. It was then endeavored to obtain the extractives by chemicals but the use of chemicals clashes with the pure food law. It was then endeavored to obtain the result by boiling the fish whole with different processes, but the great difficulty was to then cleanse the liquid of a great quantity of complex nitrogenous impurities which became mixed with it on account of boiling the flesh.

Our experiments show that if the flesh of fish or other aquatic animals is boiled with water there is produced a coagulation of the albuminous matter which is in a soluble form in the original cold material. The greatest part of the coagulated albuminous substances remains as an insoluble body in the material and closes up the pores, thereby obstructing the free circulation of the heated water through the flesh.

By our process, we first remove a great portion of the albumin by cold water in which it is soluble, so that when fresh water is applied and the mixture heated, the heated water will pass readily through the material and release the extractives. Another advantage is that it is not necessary to boil the material so in consequence the liquid when drawn off does not contain such a quantity of gelatin, and other impurities, as would be the case if the material was boiled. The cold liquid first drawn off is then used as a means of clearing the second liquid of impurities as explained in our invention.

Our invention consists of the following process: The fish or other sea animals are well washed, cleaned and then cut, chopped, ground or crushed so that the albumin and extractives may be more easily obtained. Cold water is then added to the material and the mixture may be allowed to stand, or may be stirred. The liquid which now contains a large amount of albumin in a soluble form and a small amount of extractives is separated from the material and allowed to stand so that any scum which may come to the surface may be skimmed off. Fresh water is then mixed with the material and the mixture subjected to heat. The heating process is continued until the material has been well saturated with the heated liquid but the mixture must not be allowed to boil. The heated liquid which contains extractives and an amount of complex substances causing turbidity is separated from the material and allowed to stand until any oil therein has risen, when the oil is skimmed off. The cold liquid first drawn off is then mixed with the liquid which was heated and the whole is subjected to heat. The albumin which is soluble in the cold water immediately begins to coagulate under the heat and while coagulating envelops all the suspended impurities so that when the coagulation is complete, which takes place a few minutes after the water commences to boil, the liquid is drawn off and is found to be absolutely clear, and free from any impurities. The clear liquid is then evaporated by any of the known processes until the extract reaches the desired consistency, even to a solid if so desired.

What we claim as new is:

1. The herein described process of producing an extract from fish or other aquatic animals, which consists in cleaning the fish, cutting the fish up or comminuting the same, treating the cut up portions with cold water to dissolve out the albumin, adding fresh water to the material from which the albumin has been dissolved, heating the material while keeping the temperature below the boiling point, separating the material from the heated liquid, skimming off the oil, mixing the cold liquid containing the dissolved albumin with the heated liquid and boiling the mixture, whereby the coagulated albumin precipitates impurities, drawing off the clear liquid from the impurities, and evaporating the same.

2. The herein described steps in a process of preparing an extract from fish or other aquatic animals, which consists in cutting up the fish, treating the cut up material with cold water to dissolve out the albumin, heating the albumin-free material with fresh water to a temperature below boiling point, separating the solid material from the liquid, mixing the cold liquid containing the soluble albumin with the heated liquid, and boiling the mixture.

3. The herein described steps in a process of preparing an extract from fish or other aquatic animals, which consists in treating cut up fish or similar material with cold water to dissolve the albumin, and subsequently heating the remaining material with water to dissolve the extractives, mixing the albumin solution with the extractive solution, and heating the mixture to the boiling point whereby the coagulated albumin will precipitate the impurities.

Victoria, British Columbia, Dominion of Canada, the 27th day of October, 1915.

WILLIAM VINCENT COONS.
BERT HEWITT.

Signed in the presence of—
ELIJAH BRUNSWICK SHAW,
BESSIE HEWITT.

Copies of this patent may be obtained for five cents each, by addressing the "Commissioner of Patents, Washington, D. C."